Sept. 21, 1965 C. H. PEARSON 3,207,314
SEWAGE TREATMENT APPARATUS
Filed Oct. 30, 1961

INVENTOR.
CHESTER H. PEARSON 3,207,314
SEWAGE TREATMENT APPARATUS
Chester H. Pearson, Cascade County, Mont.
(3121 4th Ave. N., Great Falls, Mont.)
Filed Oct. 30, 1961, Ser. No. 148,469
5 Claims. (Cl. 210—195)

This invention relates to a sewage treatment apparatus of the type that employs the activated sludge process.

It is an object of this invention to provide a device for the treatment of sewage and industrial wastes in a simple and efficient manner which can be installed in sewage systems of one or many homes.

Another object of this invention is to provide improved means of re-circulating the contents of the tank in which sewage or industrial waste is received whereby a greater abundance of oxygen is supplied the liquor to support the bacterial life therein.

Another object of this invention is to provide a very desirable device for contacting the liquor with air by drawing the air down to the bottom of the aeration tank and forcing it out into the liquor in small bubbles to rise to the surface thereof. In this device an abundant quantity of air is absorbed by the liquor in the tank.

Another object of the invention is to provide, in connection with a settling tank, a sludge return pipe in which sludge is returned to the aeration tank in a downward column of air without the aid of a pump or mechanical lifting device other than the impeller which aerates the liquor.

Other objects and advantages will appear in the course of this specification and with all of such objects and advantages in view, this invention consists of several novel features hereinafter fully set forth and claimed.

The invention is clearly illustrated in the drawing accompanying this specification in which.

Figure 1:
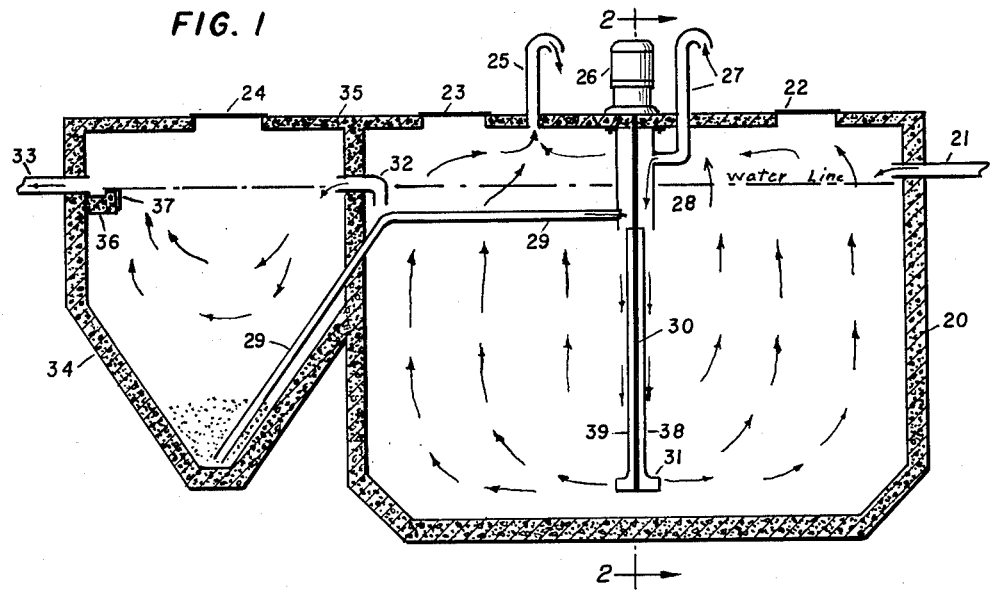
FIGURE 1 is a vertical longitudinal section, through the sewage treatment apparatus embodying a preferred form of the invention.

Referring now specifically to the drawing of a sewage treatment apparatus and first to FIGURE 1, the reference character 20 designates an aeration tank of suitable shape and dimensions, preferably having sloping walls connecting the side walls thereof with its bottom. An influent conduit 21 delivers sewage or other waste to the tank 20 at its upper end, and an effluent conduit 33 conducts the treated liquid away from a settling tank 34 which communicates with the aerating tank 20 through a passage or conduit 32.

Figure 2:
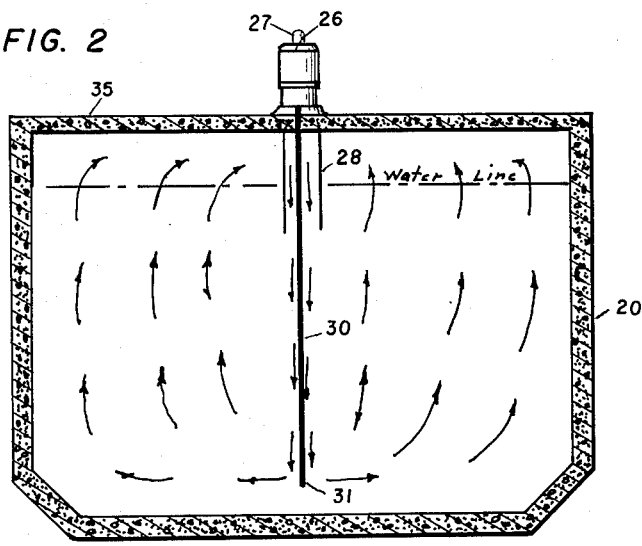
FIGURE 2 is a vertical cross-section through the sewage treatment apparatus at line 2—2 in FIGURE 1.

Extending across the top of the aerating tank 20 is a cover 35 with manhole covers 22–23–24 for inspection and maintenance. An intake pipe 27 extends through the cover to draw outside air to the aeration tank 20. Another pipe 25 extends through the cover 35 to exhaust the air from the aeration tank. At the center of cover 35 is mounted a motor 26 that is connected to an upright shaft 30. This shaft 30 has an impeller 31 at its bottom and two blades 38–39, one on each side, that extend from the impeller to the bottom of the draft tube 28 and which operate to conduct air to the impeller 31 from the outside of tank 20. When the motor 26 is in operation, the impeller 31 throws liquor radially outward from shaft 30 and impeller 31, and this displaced liquor is replaced by air from the draft tube 28, which is then forced out into the liquor in the aeration tank 20 in small bubbles which rise to the top and are exhausted out the exhaust pipe 25. The arrows in FIGURE 1 and FIGURE 2 indicate generally the flow of air through the aeration tank 20. Some of the liquor flows from the aeration tank 20 through the conduit 32 into the settling tank 34 of suitable shape and dimensions, preferably having sloping walls to concentrate the sludge of said settling tank which provides a quiescent zone in which the sludge may settle out from the liquor and the treated liquor may rise and discharge through the effluent conduit 33.

The settling tank 34 illustrated in FIGURE 1 has a trough 36 in its discharge end provided with a vertical adjustable weir 37 over which the treated liquor flows into the trough 36 and is discharged through the effluent conduit 33.

Sludge settles down from the liquor in the quiescent zone in the settling tank, and some of this settled sludge is returned to the aeration tank 20 through the sludge return pipe 29 to the draft tube 28 which is de-watered when the motor 26 is in operation. At this time the water flows into the draft tube 28 from the settling tank 34 drawing the sludge with it. This eliminates a pump or other mechanical device other than the impeller 31 to return the settled sludge to the aeration tank 20.

The operation of this apparatus will now be readily understood.

The liquor to be treated enters the aeration tank 20 through the influent 21 and is retained in this tank for bacterial action and aeration to dispose of all solids. The aeration is accomplished with a motor 26, a shaft 30 with two blades, one on each side, from an impeller 31 to the bottom of a draft tube 28. When the motor is in operation, the air is drawn down through the intake pipe 27 and draft tube 28 to the impeller 31 at the bottom of the shaft 30 and forced out into the liquid in small bubbles, thus aerating the liquid from the aeration tank 20. The liquid passes through a conduit 32 into the settling tank 34, where the sludge settles to the bottom and is returned to the aeration tank 20 through the sludge return pipe 29 to the lower end of the draft tube 28 and is discharged when the motor 26 is in operation. The excess liquid in the settling tank 34 flows over the weir 37 and is discharged into the effluent pipe 33.

While this invention has been described with particular reference to the construction shown in the drawing, and while various changes may be made in the detailed construction, it shall be understood that such changes shall be within the spirit and scope of the present invention as defined by the appended claims.

Having thus completely and fully described the invention what is now claimed as new and desired to be protected by Letters Patent of the United States is:

1. Sewage treatment apparatus comprising:
   an aerating tank adapted to contain sewage at a normal liquid level;
   a settling tank having downwardly converging sides and located adjacent said aerating tank and being in fluid communication therewith;
   an influent conduit connected to said aerating tank adapted to convey sewage thereto;
   an effluent conduit connected to said settling tank adapted to convey sewage therefrom;
   a draft tube positioned vertically in said aerating tank and extending upwardly from a location slightly below the elevation of said effluent conduit, said draft tube being in open communication with the atmosphere outside said aerating tank;
   a vertical shaft extending through said draft tube from a location outside said tank to a location adjacent the bottom of said aerating tank;
   drive means operatively connected to said shaft adapted to rotate said shaft about its own axis;
   radial impeller means fixed to said shaft at the lower end thereof;
   longitudinal blades fixed to said shaft and extending from a location slightly above the lower end of said
draft tube to a position adjacent said impeller means,
the radial projection of said impeller means being
greater than that of said blades;
and conduit means extending from the bottom interior
of said settling tank to the interior of said draft tube.

2. The apparatus as defined in claim 1 wherein said
drive means comprises:
a motor mounted on the exterior top wall of said
aerating tank, said motor including a drive shaft
connected directly to said vertical shaft.

3. The apparatus as defined in claim 1 wherein said
shaft is coaxial relative to the surrounding draft tube.

4. The apparatus as defined in claim 1 wherein said
impeller means and said blades each comprise a pair of
rectangular plates fixed to said shaft in diametrically op-
posite locations and extending radially outward there-
from.

5. Sewage treatment apparatus comprising:
an aerating tank adapted to contain sewage at a nor-
mal liquid level;
a settling tank having downwardly converging sides
and located adjacent said aerating tank and being in
fluid communication therewith;
an influent conduit connected to said aerating tank
adapted to convey sewage thereto;
an effluent conduit connected to said settling tank adapt-
ed to convey sewage therefrom;
a draft tube positioned vertically in said aerating tank
and extending upwardly from a location slightly be-
low the elevation of said effluent conduit, said draft
tube being in open communication with the atmos-
phere outside said aerating tank;
a vertical shaft extending through said draft tube from
a location outside said tank to a location adjacent
the bottom of said aerating tank;
drive means operatively connected to said shaft adapt-
ed to rotate said shaft about its own axis;
radial impeller means fixed to said shaft at the lower
end thereof;
longitudinal blades fixed to said shaft and extending
from a location slightly above the lower end of said
draft tube to a position adjacent said impeller means,
the radial projection of said impeller means being
greater than that of said blades;
and means providing fluid communication between the
bottom of said settling tank and the interior of said
aerating tank.

References Cited by the Examiner

UNITED STATES PATENTS

| | | | |
|---|---|---|---|
| 1,498,392 | 6/24 | Levy | 259—134 |
| 2,090,384 | 8/37 | Durdin | 210—197 |
| 2,294,827 | 9/42 | Booth | 261—84 X |
| 2,628,827 | 2/53 | Daman | 259—135 X |
| 2,928,661 | 3/60 | MacLaren | 261—93 X |
| 2,987,186 | 6/61 | Burgoon et al. | 210—197 |
| 3,053,390 | 9/62 | Wood | 210—208 X |

REUBEN FRIEDMAN, *Primary Examiner.*

HERBERT L. MARTIN, CHARLES SUKALO,
*Examiners.*